United States Patent [19]

Denner

[11] Patent Number: 4,702,580
[45] Date of Patent: Oct. 27, 1987

[54] APPARATUS FOR IN-CAMERA IDENTITY MARKING OF FILM

[76] Inventor: Manuel Denner, 249 W. 29th St., New York, N.Y. 10001

[21] Appl. No.: 22,286

[22] Filed: Mar. 5, 1987

Related U.S. Application Data

[63] Continuation of Ser. No. 860,522, May 7, 1986, Pat. No. 4,678,301.

[51] Int. Cl.⁴ .................... G03B 17/24; G03B 17/26
[52] U.S. Cl. ..................................... 354/106; 354/276
[58] Field of Search ............... 354/105, 106, 109, 276, 354/289.1

[56] References Cited

U.S. PATENT DOCUMENTS

| | | |
|---|---|---|
| 371,855 | 10/1887 | Rudell ................................ 354/276 |
| 1,132,070 | 3/1915 | Clarke . |
| 1,238,674 | 8/1917 | House . |
| 1,254,590 | 1/1918 | Gongaware . |
| 1,304,361 | 5/1919 | Oehring . |
| 1,309,747 | 7/1919 | Russell . |
| 1,323,364 | 12/1919 | Hood ............................ 354/276 X |
| 1,810,002 | 6/1931 | Arnold . |
| 2,051,193 | 8/1936 | Wittel . |
| 2,809,571 | 10/1957 | Christensen et al. . |
| 2,827,832 | 3/1958 | Patterson et al. . |
| 2,896,522 | 7/1959 | Stein . |
| 3,017,235 | 1/1962 | Sigmond . |
| 3,345,924 | 10/1967 | Kitrosser . |
| 3,371,587 | 3/1968 | Galletta . |
| 3,547,015 | 12/1970 | Dalton . |
| 3,631,773 | 1/1972 | Moodie . |
| 3,678,818 | 7/1972 | Moodie . |
| 3,736,850 | 6/1973 | Ishikawa . |
| 3,815,980 | 6/1974 | Roth ....................................... 352/90 |
| 3,882,512 | 5/1975 | Lawrence et al. ................... 354/109 |
| 3,906,523 | 9/1975 | Ogiso et al. ........................... 354/109 |
| 3,928,863 | 12/1975 | Stewart et al. ....................... 354/109 |
| 3,953,868 | 4/1976 | Kawamura et al. ................. 354/109 |
| 4,025,932 | 5/1977 | Miyagawa ............................ 354/109 |
| 4,079,393 | 3/1978 | Marachy et al. ....................... 354/77 |
| 4,085,412 | 4/1978 | Yoshino ................................ 354/105 |
| 4,104,658 | 8/1978 | Uchiyama et al. ................... 354/106 |
| 4,123,767 | 10/1978 | Halpern .............................. 354/107 |
| 4,139,292 | 2/1979 | Chiesa .................................. 354/109 |
| 4,168,894 | 9/1979 | Adolph ............................... 354/105 |
| 4,182,559 | 1/1980 | Driscoll et al. ...................... 354/105 |
| 4,248,510 | 2/1981 | Baker et al. .......................... 354/109 |
| 4,361,388 | 11/1982 | Micak et al. ......................... 354/106 |
| 4,362,369 | 12/1982 | Kazami et al. ....................... 354/106 |
| 4,427,279 | 1/1984 | Edelstein et al. .................... 354/107 |

*Primary Examiner*—Donald A. Griffin
*Attorney, Agent, or Firm*—Hoffman, Dilworth, Barrese & Baron

[57] ABSTRACT

A device for in-camera marking of photographs, the device including light generating means for exposing an edge position of the film and being selectively movable to various positions within the camera to correspondingly impress mark the various positions on the periphery of the photograph.

5 Claims, 9 Drawing Figures

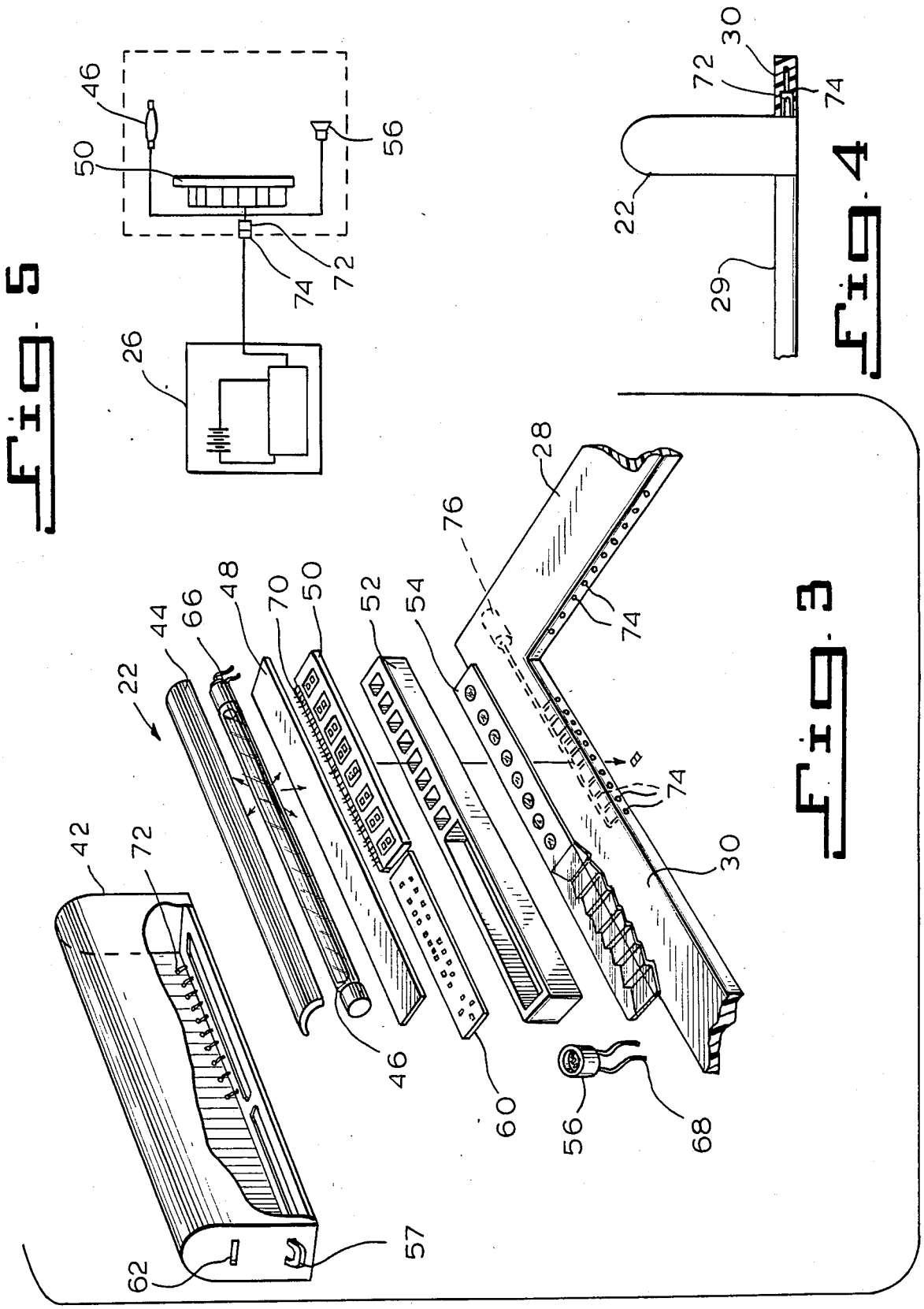

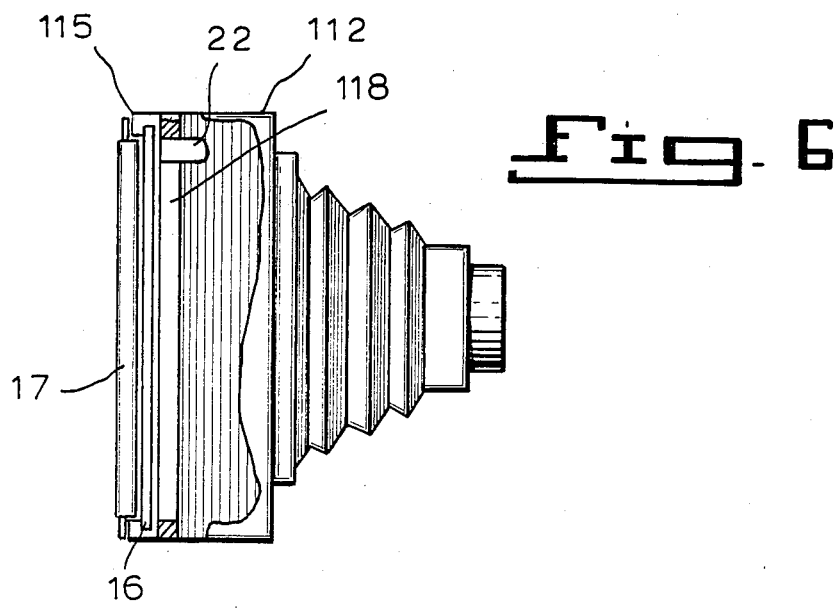
Fig. 6
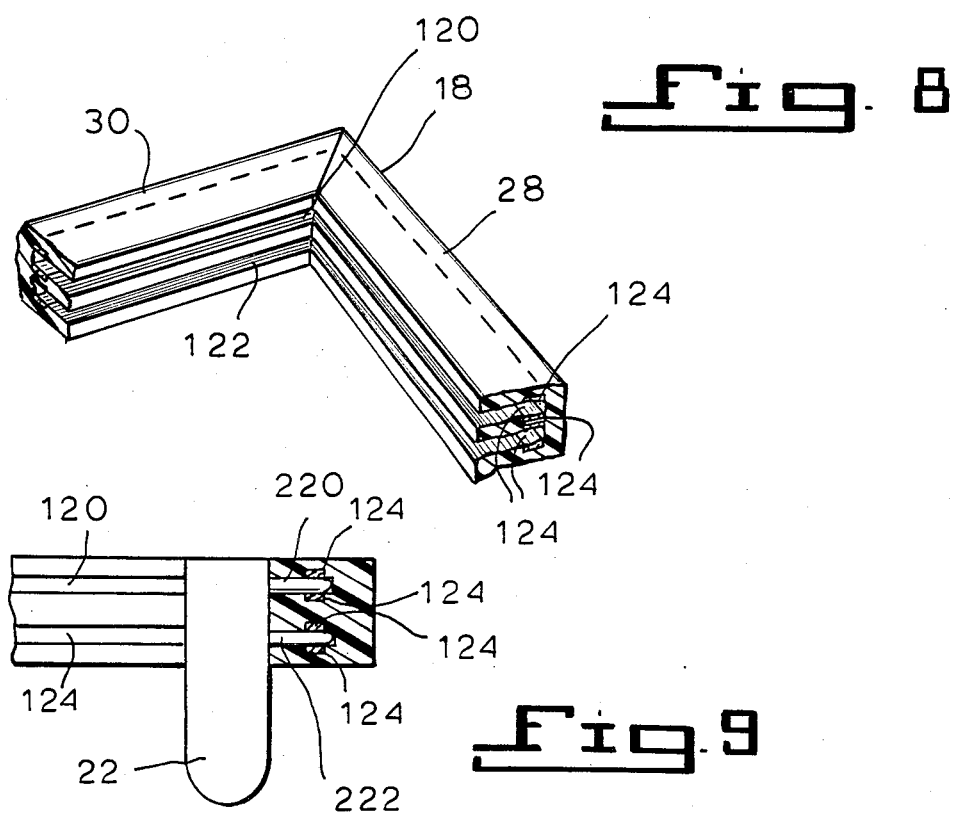
Fig. 8
Fig. 9

4,702,580

APPARATUS FOR IN-CAMERA IDENTITY MARKING OF FILM

This is a Continuation of my pending application Ser. No. 860,522 filed May 7, 1986, and now U.S. Pat. No. 4,678,301 issued July 7, 1987.

BACKGROUND OF THE INVENTION

In professional and commercial photographic studio operations it is necessary that many of the photographs taken be marked with information relating to identity, client, date, job number etc. Various expedients employed to that end have included holding captioned cards in front of the camera lens, actually physically marking the film as by scratching, post exposure of data on the film, tape labelling or tedious but meticulously practiced cataloging and filing procedures. It also is known to incorporate various form of devices in cameras to effect a film marking. Representative of such devices are those shown in U.S. Pat. Nos. 2,051,193; 2,896,522; 3,631,773; 3,906,523 and 4,182,559. While these patented devices produce the desired identification they involve unnecessarily complicated constructions, and mark identification only to a limited degree. More importantly they lack flexibility of the self-same device for use in camera situations where varying sizes of photographs are being taken and where it may be desirable to vary the location on a photograph where the marking is to be made, e.g., at a bottom margin on one photograph but on a top margin on the next succeeding photograph taken.

SUMMARY OF THE INVENTION

The present invention relates to apparatus for in-camera identity marking in addition to the object or scene photographed, of film to produce permanent marking of such film or photographs with important data relating to date taken, sequence in a series of like scenes, client etc. The apparatus is of simplified construction and can be permanently embodied in a camera body or it can be removably mounted in the camera body at the rear thereof on frames for use with formats of sizes 4"×5", 5"×7", 8"×10" and 11"×14", as well as others.

In accordance with the invention an encoder module is mounted on a frame member which frame member can either be a permanent fixed part of the camera or it can be a removable member. The frame is of open rectangular configuration, the opening therein being of the general dimensional character of a particular format, e.g., an 8"×10" size, the opening being defined by the inner periphery of the four frame sides. The encoder module which extends a distance into the frame opening includes a light proof housing which carries as an assembly therein the components involved in generating and projecting discrete light beams of identification characters which are used to expose an identification image on film. Thus there is included a lamp as a light source, a light diffuser in line with the lamp, a character font which in a preferred form is a liquid crystal display, a collimator and a lens member. The lens member is aligned with a window in the housing so that light beams passing through the liquid crystal display can be directed out of the window and onto a film strip. The housing is mounted on the inner periphery of one of the frame member sides in such manner that the window is in facing confrontation with an edge portion of a film strip held in a film cassette receivable in a camera in known manner.

The operation of the generating and projecting means and the particularized content of the marking produced therewith is controlled by a microcomputer or microprocessor unit, such unit being of construction and mode of operation well known by those skilled in the art. The microprocessor unit includes a display which denotes the input display provided therefrom to and duplicated at the liquid crystal display. Such unit can be a separate component cable connected to the frame member, or it can be built into and housed along with a self-contained power source such as a battery in an extension piece formed on the frame member. The operation of the lamp can be effected in a preferred manner with a sensor that detects the presence of film image exposure light in the camera body when a photograph is taken and such sensor being used to control the energization of the lamp in the encoder module. Lamp operation also could be effected by a manually controlled switch.

An important feature of the invention is the adaptabiliy of the encoder module for use in marking photographs of various formats or sizes. The module itself is dimensioned such that it has less length than the shortest side of a frame member used in association with the smallest format size, e.g., a 4"×5" format. The electrical components in the module are connected with terminals or contacts and these in turn are received in complemental terminal connector means arranged in each of the four sides of the frame member, so that the module can selectively be removably mounted in any one of the frame four sides to correspondingly dispose marking on any one of the four margins of the film strip. It also is possible to selectively position the module along a given frame side to thereby allow marking anywhere along a given film strip margin. Electrical power potential at the frame terminal connector means is made available from the power source of the microprocessor unit. A particular advantage is that the module can be removed from a smaller format associated frame and be used in a larger format frame so that a single module is all that is required for marking purposes in a number of format sizes.

The advantages and further features of the invention will be made more apparent from the following detailed description to be given hereinafter and will be described in terms of such features of construction, combination of elements and arrangement of parts as will be exemplified in the construction set forth and the scope of the invention will be indicated in the claims.

BRIEF DESCRIPTION OF THE DRAWINGS

A fuller understanding of the nature and objects of the invention will be had from the following detailed description taken in conjunction with the accompanying drawings in which:

FIG. 3 is an exploded perspective view of the sandwiched assembly components of which the encoder module is comprised, a portion of the frame member on which the module can be mounted being depicted and illustrating one form in which the terminal connector means are carried in such frame member;

FIG. 4 is a fragmenting elevational view, partly in section showing how the encoder module terminals are received in the FIG. 3 frame member terminal connector means;

FIG. 5 is a graphic depiction of the controlling circuitry for the apparatus;

FIG. 6 is a sectional view of the embodiment of the frame member as a fixed structure in a camera;

FIG. 8 is a fragmentary view in perspective illustrating another manner of providing terminal connector means in the frame member so that the encoder module can be selectively positioned slidably at plural locations along a given frame member side; and FIG. 9 is a fragmentary sectional view showing one manner of receiving the module terminals in the FIG. 8 frame member.

Throughout the following description, like reference numerals are used to denote like parts in the drawings.

DESCRIPTION OF THE PREFERRED EMBODIMENTS

Figure 1:
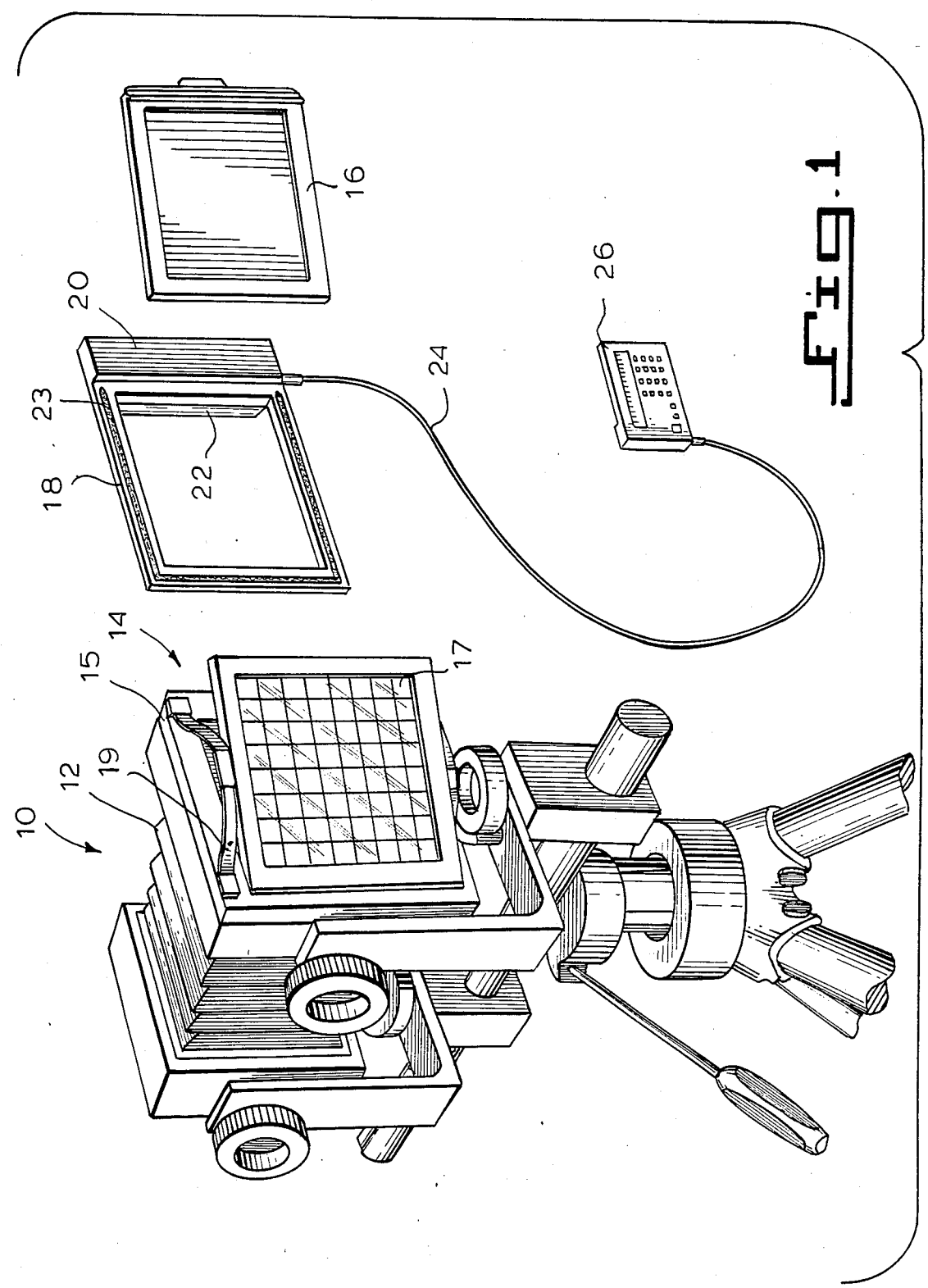
FIG. 1 is a perspective, partly exploded view of a camera in which the apparatus of the the present invention can be used, the frame member being removably mounted in the camera, the frame and film cassette being depicted in exploded position for purposes of illustration.

FIG. 1 shows a camera 10 of the type commonly employed by professional and commercial photographers for photographic work, the camera having a body part 12 at the rear end of which is a background-viewing screen unit 14. The background-viewing screen it is understood constitutes a rectangular carrier 15 in which is inset a glass viewing screen 17, the carrier being removably held on the camera body part 12 by clips and detents in well known arrangement, whereas, screen 17 is connected to blade springs 19 fixed to the carrier so that the screen can be flexed outwardly from the camera counter to the bias of the springs 19 to allow insertion of a film cassette forwardly of the screen. Other ways of mounting the background-viewing screen unit 14 to body part 12 could be used. The viewing screen 17 is shown partly open or pried out a distance from carrier 15 in FIG. 1. A film cassette 16 of known construction and carrying an unexposed strip of film or a sensitive film plate as well as a light shield, can be received in the camera immediately forwardly of the glass-viewing screen 17. The apparatus of the invention includes the frame member 18 which in the depicted embodiment is removably receivable in the camera body in front of the film cassette so that in use, the film cassette is located intermediate the glass-viewing screen 17 and the frame member. The frame member 18 includes an extension piece 20, has an encoder module 22 carried thereon and can be connected by a cable 24 with a microprocessor unit 26, all of which shall be explained in more detail below. In using the apparatus of the invention, the frame member 18 will be received in front of the viewing screen 17, the screen will be closed and the photographer will compose on the viewing screen the shot or image of the object to be photographed. When this has been done, the photographer will in respect of the marking data to be placed on the photograph, input such data by means of microprocessor unit 26 to the encoder module, a loaded film cassette will then be slid into the camera, the light shield removed therefrom, the object photographed and exposure of the marking data onto the film strip will be made by operation of the encoder module. Frame member 18 is provided with a felt member 23 of encircling expanse as shown in FIG. 1 and provided to insure light-tight positioning of the film cassette adjacent the frame member in use.

Figure 2:
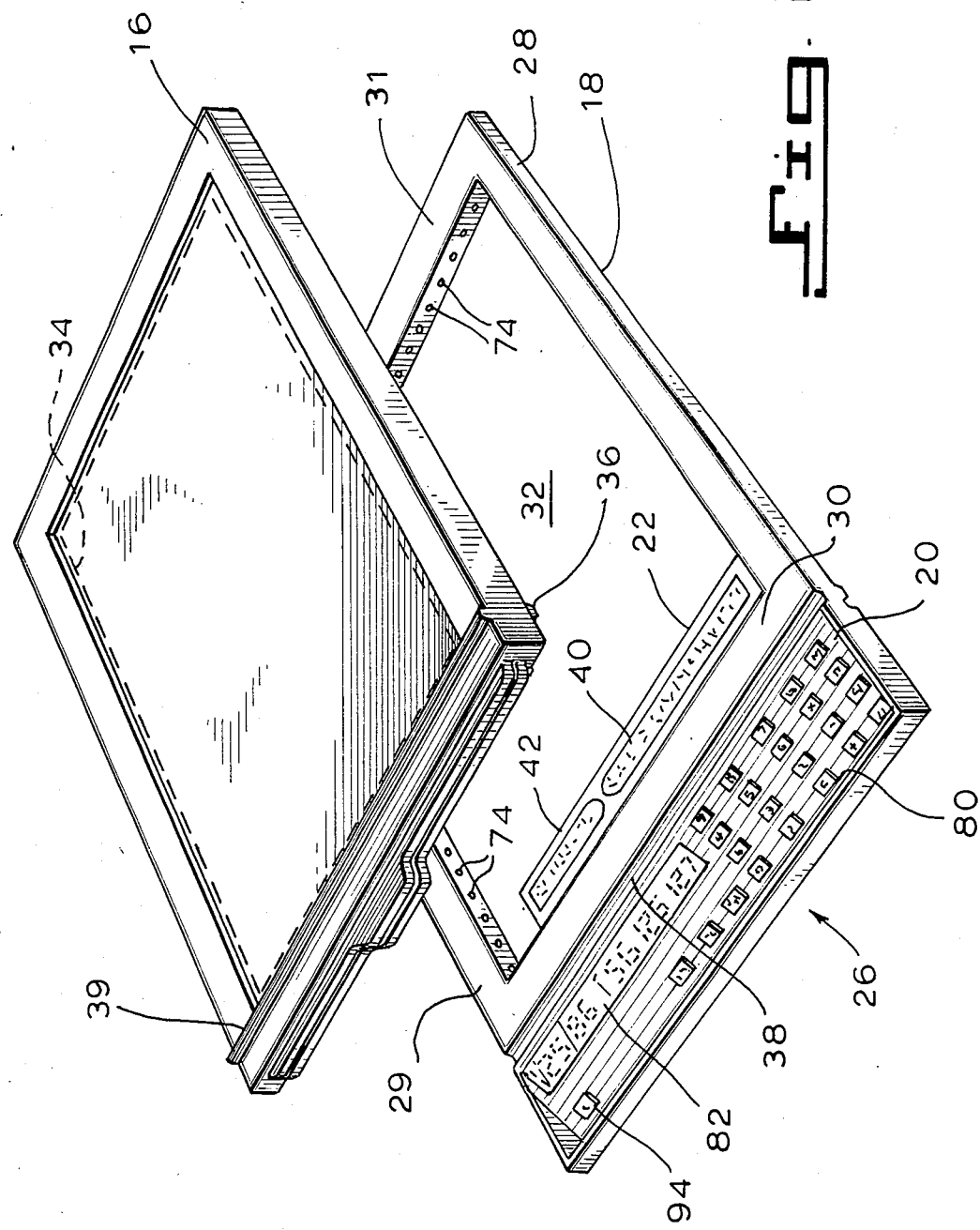
FIG. 2 is a perspective view illustrating the relative positioning the encoder module carrying frame member has with respect to the film cassette for reception thereof in the camera, the frame member being provided with an extension piece in which is carried the microprocessor unit, and the encoder module being depicted as mounted on one of the frame inner periphery short sides.

Referring to FIG. 2, it will be noted that frame member 18 is an open, generally rectangular shaped component having the two long sides 28, 29 and two short sides 30, 31, the inner peripheries of the sides defining the frame opening 3 with such opening generally registering with the expanse of a film strip 34 carried in the cassette 16 when the same are in place in the camera, such placement and registration being aided by the presence of a tongue 36 in the cassette fitting in a groove 38 in the frame member. A similar tongue 39 at the opposite side of cassette 16 insures proper registration of the cassette and viewing screen 17. Frame extension piece 20 is formed as a preferably integral extension of frame short side 30, with the encoder module 22 being depicted by way of example as removably mounted at the inner periphery of such short side since as will be explained and the invention provides, the module could also be mounted at the inner periphery of any one of the other three frame sides with equal facility depending on where the marking data is to be marked on the photograph. In the mounting depicted, the encoder module 22 is disposed such that a window 40 in the module light proof housing 42 is in facing confrontation with a peripheral edge portion of the film strip in the cassette, such window being generally on a planar line with the viewed upper surface of frame member short side 30.

The encoder module 22 as same is depicted in FIG. 3 includes light proof housing 42 in which is sandwiched as an assembly the certain components required for generating and projecting discrete light beams of identification characters onto the film strip to expose an identification image thereon. The assembly includes in sequentially composed assembly, a reflector 44, a light tube or lamp 46, a light diffuser plate 48, a liquid crystal display element 50 operable to generate discrete alphanumeric characters, a light collimator element 52 and a lens bank 54. The assembly is arranged such that when lamp 46 is energized and light beams pass through the liquid crystal display such beams in discrete character form are directed by the lens bank through housing window 40. The encoder also may include a light sensor such as a photo-cell 56 carried, e.g., on a clip 57 at the outside of housing 42 and employed to sense image exposing light present in the camera when the photograph is taken and thereby trigger energization of lamp 46 to provide contemporaneous marking imaging on the film strip as well. In addition to marking effected with liquid crystal display 50, an indicia bearing transparency 60 can be received in the housing through slot 62 in placement alongside the liquid crystal display and between the diffuser 48 and collimator 52. Marking will be made on the film through the agency of this element in the same manner as the display 50, but the transparency would be used for marking of data of a more personalized nature such as a photographer's name, special logo or like data not readily producible with a liquid crystal display.

Suitable circuit components such as wiring 66 to the lamp, that 69 for the photo-cell and conductor components 70 as associated with the liquid crystal display are provided. These are arranged and provided in accordance with well known practice and an operating circuit having terminals 72 (FIG. 4) extending sidewise outwardly from the bottom of housing 42 results, with a representative array of how these terminals are arranged being shown at the rear bottom part of the housing depiction in FIG. 3. Complemental terminal connector means 74 are provided in the frame four sides to be receptive of the terminals 72 so that the module 22 selectively can be positioned in the frame member to mark a given one of the four edge portions of the photograph. The terminal connector means 74 in turn can be electrically connected to a socket 76 such as receives a plug on cable 24 leading from the microprocessor unit 26 (FIG. 1). Where the terminal connector means 74 are connected with a microprocessor carried in extension piece 20 and electrical power means embodied therewith, the such connector means would be connected to the microprocessor unit in known manner (not shown).

An important advantage of the invention is the flexibility it provides in marking photographs of various format sizes. Such sizes generally include but are not limited to 4"×5", 5"×7", 8"×10" and 11"×14", these being the more commonly used ones. While a frame member 18 will be provided in association with each of the aforementioned format sizes, it is not necessary that there be individual ones of the encoder module 22 for each frame size. A single encoder will suffice. The encoder module is of compact size and can be made with a housing length only about 3½ inches long, about 1¾ inches deep and about ½ inch wide and effective to mark characters in an array about ⅛"×3". Such dimensions thus allow the same encoder module to be employed in a frame associated with any one of the aforementioned format sizes since the smallest of the controlling dimensions is the 4 inch long short side of a 4"×5" format arrangement. Terminal connector means 74 and where required if the microprocessor unit is not built into the frame member, sockets 76 will be provided in the varying sized frame members as above described.

The operation of the apparatus for the purpose of effecting marking will now be described with reference being had to FIGS. 2, 3 and 5. It will be understood that a frame embodying the microprocessor unit has already been inserted in the back of the camera body and the image of the object composed by the photographer. The photographer will now set up the marking data procedure using the microprocessor unit 26. This unit is a programmable component of a type well known to those skilled in the art and very much like the widely used programmable hand-held calculator, such component having computer capability. The format presentation thereof is shown generally at 80 and is a key pad with separate mode keys. The mode keys activate the specific information elements into which it is desired to input data. Some functions could be electively automatic such as continuous up-dating calendar and a self-advancing exposure counter. Also included is a visual display 82 (which can be a liquid crystal display) which will display the particular marking data desired to be marked on the film as a same produced with appropriate input to the microprocessor unit. The liquid crystal display 50 in the encoder module mirrors the display 82 in that the same characters appearing on the front of the microprocessor unit are duplicated in display 50 except in one important respect. The liquid crystal display element 50 is connected in the circuit with reversed polarization thereby to render the characters formed in display 50 transparent with a black background making the display 50 in effect a negative through which light beams will pass to effect positive imaging.

Figure 7:
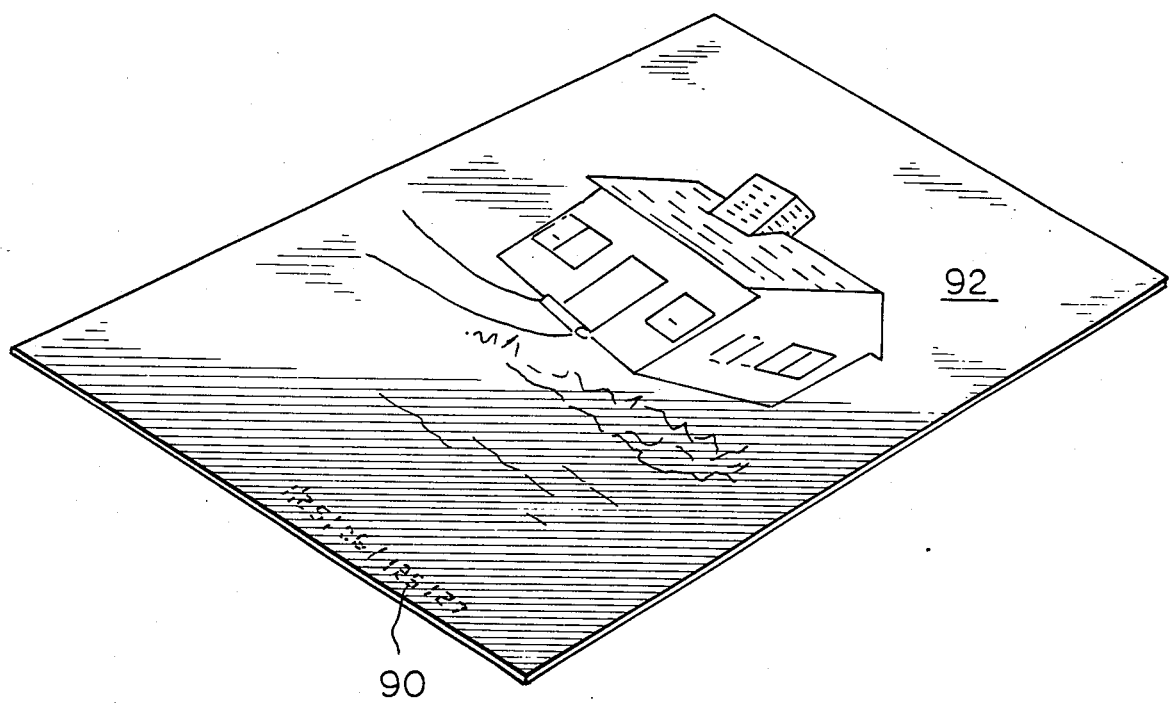
FIG. 7 is a view of a photograph marked with the apparatus of the invention, the marking having been effected at the lower edge portion thereof.

With the marking input data set, the photographer now inserts film cassette 16, removes the shield therefrom and exposes the film to take the picture. Since the microprocessor includes a source of electrical potential therein, e.g., a battery, this potential is available to power the encoder. By circuit arrangement of known character, the photo-cell 56 sensing the presence of light in the camera body can be used to initiate power supply to and hence triggering of the lamp 46. This will cause marking data exposure on the film strip to produce, e.g., the film marking 90 on picture 92 (FIG. 7). A manual triggering of the lamp 46 also could be used by pressing switch button 94 on the microprocessor unit 26.

FIG. 6 shows the mounting of an encoder module receptive frame member 118 in a camera body 112 as a permanent part thereof, the depicted embodiment being one wherein the structure of the background-viewing screen carrier 115 has been appropriately modified to serve such function. In this embodiment, the frame could be powered and marking controlled from a remote microprocessor unit 26 (FIG. 1).

FIGS. 8 and 9 show how the frame member 18 can be provided with terminal connector means to permit slidable positioning of the encoder module 22 at any one of varying locations along each side of the frame member inner periphery. In this embodiment, the frame member has two continuous slots 120, 122 extending around the inner periphery and disposed at the base of each slot are continuous contacts 124 associated with the slots. These contacts 124 can be engaged by the terminals 220, 222 of the encoder module 22 regardless of its longitudinal positioning along a given frame side. The contacts will as will be apprehended and understood by those skilled in the art, be electrically connected to the control unit in known manner.

While there is above disclosed only some embodiments of the marking apparatus of the present invention, it will be appreciated that various modifications can be made therein without departing from the scope of the disclosed invention.

What is claimed is:

1. In a camera having a camera body with respective front and rear ends, a background viewing screen unit carried on the rear end of said body, a film cassette for holding a rectangular-shaped strip of unexposed photographic film, said cassette being removably receivable in said body forwardly adjacent said viewing screen, and a frame member disposed in said body in front of said cassette, said frame member having a generally rectangular opening therein which registers with the strip of film and is defined by a correspondingly configured rectangular inner frame periphery, an encoder module for marking identification data on the film, the module being mountable on said frame at the inner periphery thereof and comprising a lightproof housing, the housing having a window therein which disposes in facing confrontation with an edge portion of a cassette held film strip, and electrically operated means for generating and projecting discrete light beams of identification characters through said window onto said film strip edge portion to expose an identification image thereon, said generating and projecting means including circuit components and terminals therefor associated with operation of said generating and projecting means, said frame member having complemental terminal connector means receptive of said terminals in at least one of said frame inner peripheral sides whereby said module can be removably mounted on said one inner peripheral side and electrical power potential available at said terminal connector means communicated to said generating and projecting means for operating same, the terminal connector means being such that said terminals are slidably movable therein for selectively slidably positioning said module at plural locations along said one inner peripheral side.

2. The camera of claim 1 in which said frame member additionally has complemental terminal connector means in at least one of the inner peripheral sides adjacent to said one inner peripheral side, said module being selectively removably mountable on said one and said at least one adjacent sides, the terminal connector means in both said one and said at least one adjacent sides being such that said terminals are slidably movable therein whereby the module can be selectively slidably positioned at plural locations along the inner peripheral side in which it has been mounted.

3. The camera of claim 2 in which said terminal connector means comprises contacts disposed at the base of slots extending along the inner peripheries of said one and said at least one adjacent sides.

4. The camera of claim 1 in which said frame is removably mountable in said camera.

5. The camera of claim 4 in which the frame is one of a plurality of frames each associated with different ones of a corresponding plurality of film strip sizes.

* * * * *